O. STARK.
LOCK NUT.
APPLICATION FILED MAY 19, 1919.
1,317,332.
Patented Sept. 30, 1919.
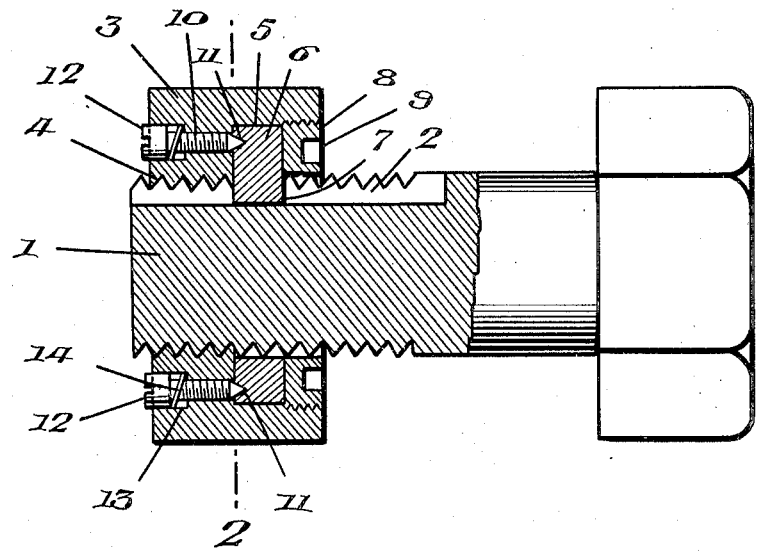
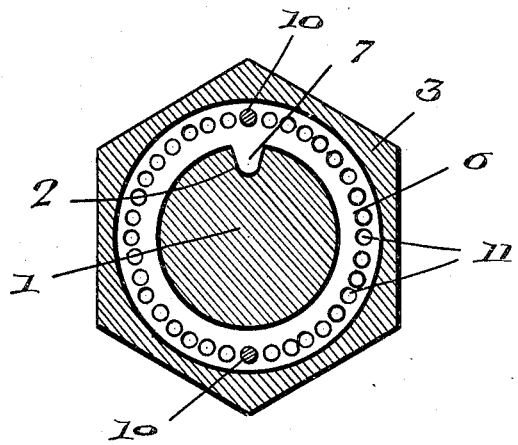
Witness
Thoren Cay
Inventor
Otto Stark
By W. J. FitzGerald & Co.
Attorney

UNITED STATES PATENT OFFICE.

OTTO STARK, OF RHINELANDER, WISCONSIN.

LOCK-NUT.

1,317,332. Specification of Letters Patent. Patented Sept. 30, 1919.

Application filed May 19, 1919. Serial No. 298,134.

*To all whom it may concern:*

Be it known that I, OTTO STARK, a citizen of the United States, residing at Rhinelander, in the county of Oneida and State of Wisconsin, have invented certain new and useful Improvements in Lock-Nuts; and I do hereby declare the following to be a full, clear, and exact description of the invention, such as will enable others skilled in the art to which it appertains to make and use the same.

This invention relates to lock nuts, and aims to provide a novel and improved assemblage of locking means with a nut for holding it against rotation on the bolt, and including a loose ring located within the nut and having means to non-rotatably engage the bolt, and means being provided for preventing relative rotation between said ring and nut to thereby prevent the nut from turning on the bolt.

A further object is the provision of such a device wherein the locking device is concealed within the nut in a novel manner, and with a simple construction to carry out the intended result in a simple yet efficient manner.

With the foregoing and other objects in view, which will be apparent as the description proceeds, the invention resides in the construction and arrangement of parts hereinafter described and claimed, it being understood that changes can be made within the scope of what is claimed without departing from the spirit of the invention.

The invention is illustrated in the accompanying drawing, wherein—

Figure 1 is a diametrical section of the nut and bolt, portions being shown in elevation.

Fig. 2 is a cross section on the line 2—2 of Fig. 1.

The bolt 1 is provided with a longitudinal groove 2, and the nut 3 has a threaded aperture 4 to threadedly engage on the bolt, as usual.

In carrying out the invention, the nut 3 is provided with a counter bore 5 extending from its rear side or face, and a locking ring 6 is disposed in the bore 5 against the closed end thereof and is rotatable relatively to the nut, being provided with an inwardly extending lug 7 to slide within the groove 2, thereby restraining the ring against rotation on the bolt. This ring 6 is retained in the counter bore or recess 5 by means of a ring 8 screw threaded within the recess and flush with the rear side of the nut, the ring 8 being provided with opposite sockets 9 for the engagement of a suitable wrench to screw said ring into the nut in assembling the parts.

As a means of locking the nut 3 and ring 6 together to prevent rotation between them, one or more set screws 10 are threaded rearwardly into the nut 3 from the forward face, and their tips are engageable in seats or notches 11 provided in the forward side of the ring 6 in an annular series so that said screws can engage in said notches in various angular positions of the parts. The heads 12 of the screws 10 fit within recesses 13 in the outer or forward face of the nut, and spring washers 14 are disposed in said recesses behind the heads 12, whereby the screws in being tightened will not unscrew accidentally due to the tension of the washers 14.

In use, when the screws 10 are loosened or retracted from the ring 6, the nut can be turned on the bolt for applying or removing the nut, and when the nut is tightened, the screws 10 are screwed rearwardly into engagement with the notches of the ring 6, thereby locking the nut against rotation, inasmuch as it is held by the screws to the ring 6 which is prevented from turning on the bolt.

Having thus described the invention, what is claimed as new is:—

1. A nut having a recess at one side, a ring disposed loosely in said recess and having a portion to slidably engage a bolt to prevent the ring from turning thereon, means within the mouth of the recess for retaining said ring therein, and other means movably mounted within the nut to move into and out of the recess for engaging and disengaging said ring, and operable for preventing said ring and nut from rotating relatively.

2. A nut having a recess at one side, a ring disposed loosely in said recess and having means to slidably engage a bolt to prevent the bolt turning thereon, a second ring threaded into said recess to retain the first named ring therein, and a set screw threaded into the nut from the opposite side, the corresponding side of the first named ring having an annular series of notches for the engagement of said screw.

3. A nut having a recess in its rear side, a locking ring disposed loosely in said recess and having an inwardly extending lug to slidably engage a groove in a bolt, and also having annular series of notches in its forward side, a retaining ring screw threaded within said recess flush with the rear side thereof, a set screw threaded into the forward side of the nut to engage in said notches, the forward side of the nut having a recess receiving the head of the screw, and a spring washer in the last named recess behind the head of the screw.

In testimony whereof I have signed my name to this specification in the presence of two subscribing witnesses.

OTTO STARK.

Witnesses:
RICHARD CARPENTER,
JOHN D. GILLIGAN.